United States Patent
Mueller et al.

(10) Patent No.: US 10,465,552 B2
(45) Date of Patent: Nov. 5, 2019

(54) METHOD FOR THE CONTROL AND PROTECTION OF A GAS TURBINE AND GAS TURBINE USING SUCH METHOD

(71) Applicant: ANSALDO ENERGIA SWITZERLAND AG, Baden (CH)

(72) Inventors: Eric Andre Mueller, Zurich (CH); Andreas Belzner, Bad Sackingen (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 0 days.

(21) Appl. No.: 14/797,823

(22) Filed: Jul. 13, 2015

(65) Prior Publication Data
US 2016/0010495 A1 Jan. 14, 2016

(30) Foreign Application Priority Data
Jul. 11, 2014 (EP) ..................................... 14176781

(51) Int. Cl.
F01D 21/00 (2006.01)
G05B 23/02 (2006.01)
F02C 9/20 (2006.01)

(52) U.S. Cl.
CPC .............. F01D 21/003 (2013.01); F02C 9/20 (2013.01); G05B 23/0221 (2013.01)

(58) Field of Classification Search
CPC .................................................. G05B 23/0221
See application file for complete search history.

(56) References Cited

U.S. PATENT DOCUMENTS

| 1,457,855 A | 6/1923 | Richardson |
| 6,167,690 B1 | 1/2001 | Hepner et al. |
| 6,892,127 B2 | 5/2005 | Wiseman |

(Continued)

FOREIGN PATENT DOCUMENTS

| CN | 1205464 A | 1/1999 |
| EP | 1 457 855 A1 | 9/2004 |

(Continued)

OTHER PUBLICATIONS

The extended European Search Report dated Jan. 28, 2015, by the European Patent Office in corresponding European Patent Application No. 14176781.4-1807. (5 pages).

(Continued)

Primary Examiner — Imran K Mustafa
(74) Attorney, Agent, or Firm — Buchanan Ingersoll & Rooney PC (57) ABSTRACT

In a method for the control and protection of a gas turbine a gas turbine performance and lifetime indicative process quantity is estimated from a set of available process signals. The gas turbine performance and lifetime indicative process quantity is simultaneously evaluated by two different estimation methods, whereby a first estimation method has a high prediction accuracy, and a second estimation method has a high availability, a continuous adaptation of the second estimation method is conducted in order to align the output signals of the two estimation methods, and in case of a failure detected in the supervision of the first estimation method the adaptation of the second estimation method is stopped, and the output of the first estimation method is switched to the output of the second estimation method.

13 Claims, 4 Drawing Sheets

(56) References Cited

U.S. PATENT DOCUMENTS

| | | |
|---|---|---|
| 7,065,468 B2 | 6/2006 | Wiseman |
| 8,914,265 B2 | 12/2014 | Zhang et al. |
| 9,140,196 B2 | 9/2015 | Fuchs |
| 9,284,890 B2 | 3/2016 | Panov |
| 2004/0123600 A1 | 7/2004 | Brunell et al. |
| 2004/0172187 A1 | 9/2004 | Wiseman |
| 2004/0245783 A1* | 12/2004 | Gilbreth ............ H02J 1/10 290/52 |
| 2006/0009950 A1 | 1/2006 | Wiseman |
| 2007/0142932 A1* | 6/2007 | Stewart ............ G05B 5/01 700/20 |
| 2008/0208487 A1 | 8/2008 | Goebel et al. |
| 2010/0024536 A1* | 2/2010 | Adibhatla ......... G05B 17/02 73/112.01 |
| 2011/0077895 A1* | 3/2011 | Muramatsu ........ G01K 7/42 702/130 |
| 2011/0224959 A1 | 9/2011 | Zhang et al. |
| 2012/0102968 A1 | 5/2012 | Fuchs |
| 2012/0297788 A1 | 11/2012 | Panov |

FOREIGN PATENT DOCUMENTS

| | | |
|---|---|---|
| EP | 2 447 511 A1 | 5/2012 |
| JP | 2003-065081 A | 3/2003 |
| WO | 2010/043563 A2 | 4/2010 |
| WO | 2011/098193 A1 | 8/2011 |

OTHER PUBLICATIONS

Office Action (First Office Action) dated Nov. 15, 2017, by the State Intellectual Property Office (SIPO) of the People's Republic of China in corresponding Chinese Patent Application No. 201510403025.0, and an English Translation of the Office Action. (11 pages).

* cited by examiner

METHOD FOR THE CONTROL AND PROTECTION OF A GAS TURBINE AND GAS TURBINE USING SUCH METHOD

BACKGROUND OF THE INVENTION

The present invention relates to the technology of gas turbines. It refers to a method for the control and protection of a gas turbine in which a gas turbine performance and lifetime indicative process quantity is estimated from a set of available process signals.

The invention further refers to a gas turbine using said method.

PRIOR ART

Figure 4:
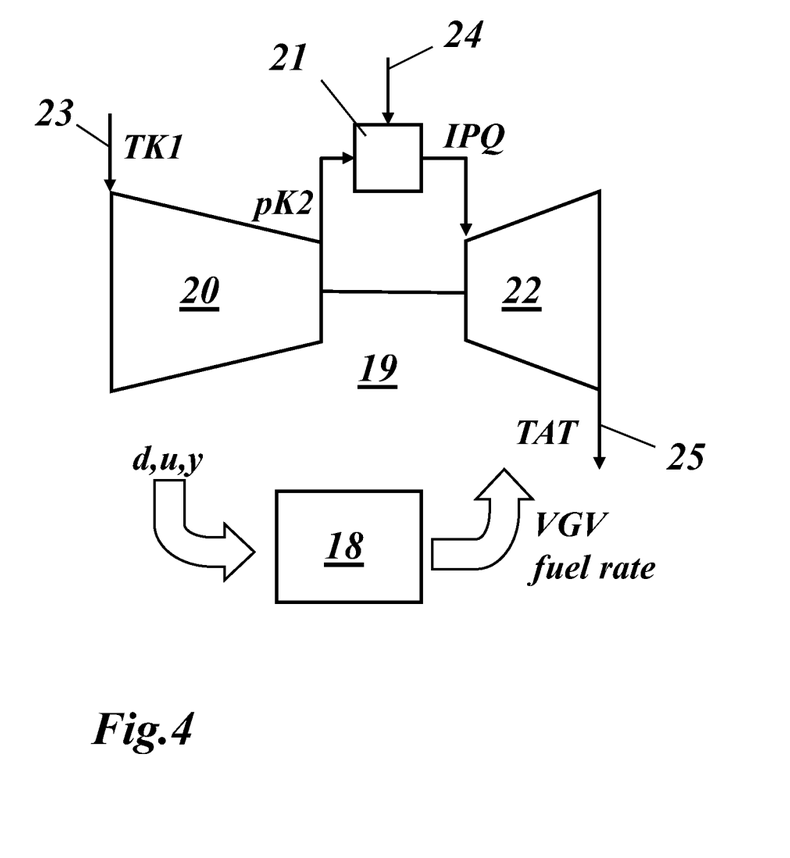
FIG. 4 shows a basic diagram of gas turbine with a respective control/protection unit and some of the related process variables.

FIG. 4 shows a basic diagram of a gas turbine 19, which comprises a compressor 20, a combustor 21 and a turbine 22. Compressor 20 sucks in ambient air via air inlet 23 with a compressor inlet temperature TK1. The mass flow rate of the compressor can be adjusted by moving the variable guide vanes VGV. The air is compressed and exits compressor 20 with a compressor outlet pressure pK2. The compressed air is used in combustor 21 to burn a fuel, which is supplied via fuel supply 24. The generated hot gas drives turbine 22 and exits the turbine 22 at exhaust gas outlet 25 with a turbine exhaust temperature TAT.

For the control and protection of gas turbine 19, typically a temperature indicative of the gas turbine performance and lifetime is used in a controller 18. Such a temperature can for example be an indicative turbine inlet temperature. Since on a field engine, such an indicative turbine inlet temperature cannot be measured, this quantity is usually estimated.

The state-of-the-art solution to estimate the indicative turbine inlet temperature is characterized as follows:

The indicative turbine inlet temperature is calculated as an algebraic function of a set of available process measurements, such as TAT (turbine exhaust temperature), pK2 (compressor outlet pressure), TK1 (compressor inlet temperature), etc.

This algebraic function is usually calibrated to a validated aero-thermal model of the gas turbine and/or tuned on the real engine during commissioning.

A major deficiency of the state-of-the-art solution is the inherent trade-off between prediction accuracy on one side, and availability on the other side:

From an operational aspect, the indicative turbine inlet temperature estimation is required to have a high accuracy in order to maximize the performance and the lifetime of the gas turbine (smaller safety margins).

From an availability point of view, however, it is favourable to have a simple indicative turbine inlet temperature estimation function with a minimum number of independent variables (inputs).

A further deficiency of the state-of-the-art solution is that the response behaviour during engine transients of the indicative turbine inlet temperature estimation is governed by the dynamic properties of the measurement sensors involved. In particular, the indicative turbine inlet temperature estimation shows artificial excursions of considerable magnitude during fast engine transients if the input signals to the indicative turbine inlet temperature estimation function are dynamically not exactly aligned.

In the prior art, various documents deal with problems of calculating and using an indicative turbine inlet temperature as a control variable for gas turbine operation.

Document U.S. Pat. No. 6,167,690 B1 discloses a control system for controlling at least one variable (TITm) of a process, the at least one variable (TITm) being calculated from a multiplicity of measured process variables (TATm, pCm), the measured process variables (TATm, pCm) in each case being measured via associated measuring sections, the transfer functions of which have a different time response. An improvement in particular during transient actions is achieved in that, to avoid instability, correction means which equalize the different time responses of the individual measuring sections are provided.

Document WO 2010/043563 A2 discloses a gas turbine model and a method for the modeling of a gas turbine, which permits transient modeling with high precision and at the same time numerically efficient means for modeling a gas turbine. The solution is based on a gas turbine model, which consists of a plurality of sub models. These sub models are either purely dynamic or static, which allows significant simplifications in the numerical solution of the overall model. System parts, which simulate the effects of volumes, metal masses, of actuators, and of measuring systems are regarded as dynamic. The remaining system parts are regarded as static over a time characteristic.

Document EP 2 447 511 A1 describes a method involving forming derivation of hot gas temperature at different areas of a gas turbine over pressure measurements by pressure sensors. The pressure measurements are executed in a hot gas flow produced in a combustion chamber of the turbine and directly before a blade series of the turbine. A pressure drop is determined between measuring positions that lie downstream to fire present in the chamber. A turbine flange is arranged in the turbine at a transition between the chamber and the turbine.

Document WO 2011/098193 A1 describes a method of determining an exit temperature of a gas exiting a combustor of a gas turbine, the method comprising: determining a mass flow and a temperature of fuel being delivered to the combustor; determining a mass flow and a temperature of air being delivered to the combustor; determining a temperature dependence of the specific heat capacity of a burnt mixture of the fuel and the air being delivered to the combustor; and determining an exit temperature of the burnt mixture exiting the combustor based on the determined mass flow and temperature of the fuel, the determined mass flow and temperature of the air, and the determined temperature dependence of the specific heat capacity of the burnt mixture. Further a method of controlling a gas turbine is described.

SUMMARY OF THE INVENTION

It is an object of the present invention to provide a method for the control and protection of a gas turbine, which increases the availability and/or accuracy of a gas turbine performance and lifetime indicative process quantity.

It is another object to provide a gas turbine using such method.

In the method for the control and protection of a gas turbine according to the invention a gas turbine performance and lifetime indicative process quantity (IPQ) is estimated from a set of available process signals. The method is characterized in that in order to circumvent the trade-off between estimation accuracy and availability said gas turbine performance and lifetime indicative process quantity is simultaneously estimated by at least two different estimation methods, whereby a first estimation method has a high prediction accuracy, a second estimation method has a high availability, a continuous adaptation of said second estimation method is conducted in order to align the output signals of the two estimation methods, and in case of a failure of said first estimation method said adaptation of said second estimation method is stopped, and that the output of said first estimation method is switched to the output of said second estimation method.

An indicative process quantity IPQ can for example be a temperature a spatial temperature gradient, a temperature gradient over time, a pressure, a pressure gradient, the composition of inlet gases, of hot gases, of fuel or a combination thereof. Other parameters are conceivable by a person skilled in the art. For example a combination of humidity and hot gas temperature can be indicative of the life time consumption during operation since heat capacity of hot gases and heat transfer from hot gases to components of the turbine exposed to the hot gases depend on the humidity.

The estimation methods can for example be an explicit or implicit function using measured quantities of the gas turbine process. The estimation method can also be a dynamic system. For example a so called observer can be used as a parameter and process estimator which is based on a dynamic model of the gas turbine. The observer uses commanded process inputs (e.g., fuel mass flow rate, compressor variable guide vane position, etc.), a vectorial signal of measured external inputs (e.g., relative humidity, ambient pressure, mechanical speed, etc.), and compares the predicted process outputs with the actual, measured outputs (e.g., TK2, pK2, TAT, PWR etc.) in order to update the prediction and to determine an accurate estimate of the indicative process quantity IPQ.

An embodiment of the method according to the invention is characterized in that said gas turbine performance and lifetime indicative process quantity is the hot gas temperature at the combustor exit.

Another embodiment of the method according to the invention is characterized in that said gas turbine performance and lifetime indicative process quantity is the temperature at the inlet of the first turbine stator (vane) row.

A further embodiment of the method according to the invention is characterized in that said gas turbine performance and lifetime indicative process quantity is the temperature at the inlet of the first turbine blade row.

An embodiment of the method according to the invention is characterized in that said first estimation method compares predicted process outputs, which are determined based on a dynamic model of the gas turbine, with measured process outputs in order to determine said accurate estimate of said gas turbine performance and lifetime indicative process quantity.

Still another embodiment of the method according to the invention is characterized in that said second estimation method is an elementary method to estimate said gas turbine performance and lifetime indicative process quantity, for example a correlation of the following type:

$$T_A = a + \text{TAT} + b \cdot pK2 + c,$$

with parameters a, b, c, where TAT is the turbine exhaust temperature and pK2 the compressor outlet pressure.

Yet another embodiment of the method according to the invention is characterized in that said continuous adaptation mechanism uses a PI controller to adjust an additive offset at the output of said second estimation method in order to align the output signals of the two estimation methods.

A further embodiment of the method according to the invention is characterized in that said switching of the first output of said first estimation method to the output of said second estimation method is implemented as a bumpless (steady) transfer.

The gas turbine according to the invention comprises a compressor, a combustor and a turbine, whereby said gas turbine is controlled and protected by a control/protection unit, which receives and processes various input parameters and controls and/or protects said gas turbine in accordance with said received input parameters.

It is characterized in that said control/protection unit works according to the inventive method.

BRIEF DESCRIPTION OF THE DRAWINGS

The present invention is now to be explained more closely by means of different embodiments and with reference to the attached drawings.

DETAILED DESCRIPTION OF DIFFERENT EMBODIMENTS OF THE INVENTION

The key idea of the present invention is to circumvent the trade-off between estimation accuracy and availability by the simultaneous evaluation of two estimation methods—a method A that has a high prediction accuracy, and a method B that has a high availability (e.g., less input dependencies)—and the continuous adaptation of method B in order to align the outputs of the two methods A and B.

In case of a failure of method A (e.g., due to a sensor loss at the input of method A), the adaptation of method B is stopped, and the output of method A is switched by a bumpless transfer to the output of method B.

Furthermore, it is proposed to augment the method A with a model-based prediction of the signals at the input of method A in order to accelerate the estimation and to improve the dynamic accuracy of the estimation method A.

Below, three potential embodiments of the invention are described.

Figure 1:
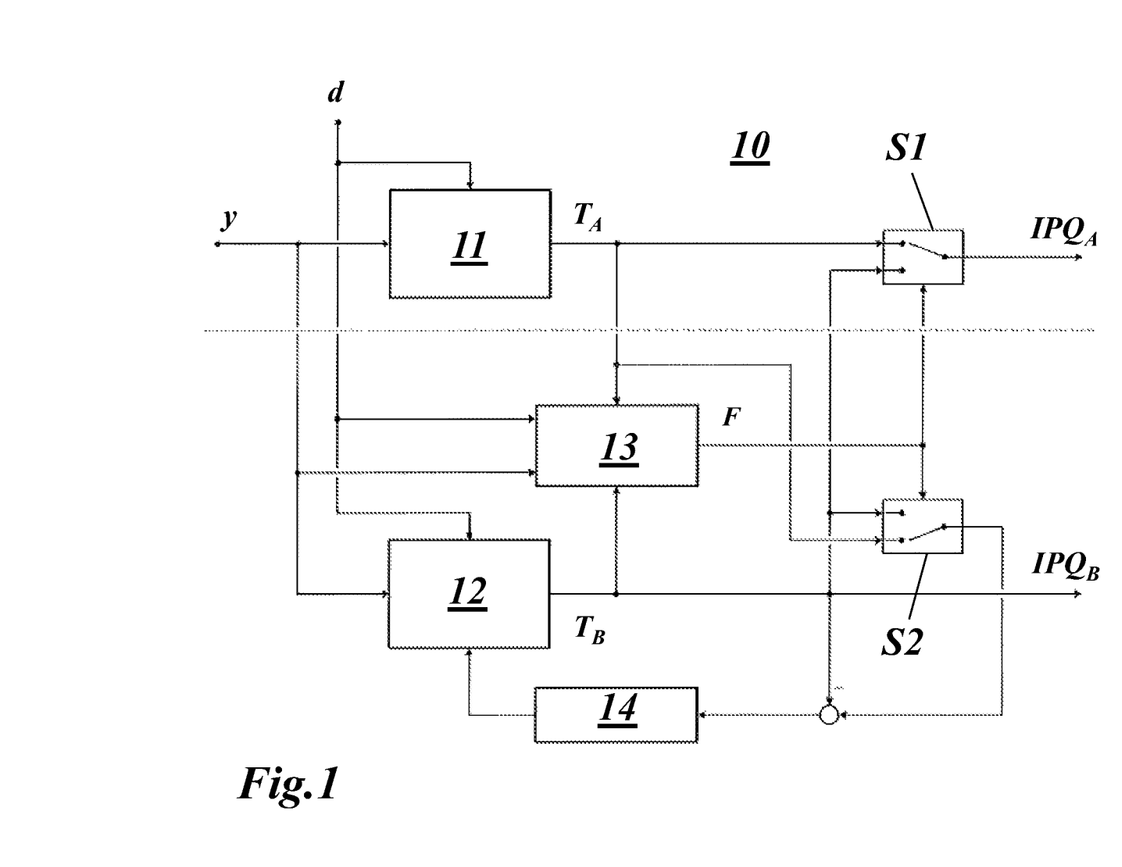
FIG. 1 shows a schematic diagram of a first embodiment of the invention: Continuous adaptation of a simple and robust IPQ estimator 12 to match the output of a more complex IPQ estimator 11; If a fault in the evaluation of IPQ estimator 11 is detected, the adaptation 14 is stopped and the output of IPQ estimator 11 is switched (bumpless transfer) to the output of IPQ estimator 12.

The embodiment shown in FIG. 1 is based on two IPQ estimators 11 and 12. IPQ estimator 11 applies a more complex method to calculate the value of IPQ.

IPQ estimator 12 applies an elementary method to calculate IPQ, for example a correlation of the following type:

$$T_B = \alpha TAT + b\ pK2 + c,$$

with parameters a, b, c, where TAT is the turbine exhaust temperature and pK2 the compressor outlet pressure.

The adaptation mechanism 14 can, for instance, be implemented as a PI controller that acts on the constant c used by the IPQ estimator 12:

$$c = c_0 + (K_P + K_I/s) \cdot (T_A - T_B),$$

where $K_P$ and $K_I$ are the parameters of the controller transfer function and s is the complex argument (frequency variable) of the Laplace transform. Furthermore, the adaptation can be modified in order to consider absolute or rate (gradient) limitations.

The variable d in FIG. 1 is a vectorial signal of measured external inputs (e.g., ambient pressure), and y is a vectorial signal of measured process quantities (e.g., TAT, pK2, etc.).

The evaluation of IPQ estimator 11 is supervised and a fault indicative signal F is used to actuate two switches S1 and S2 and to switch the output of IPQ estimator 11 and to stop the adaptation of IPQ estimator 12 if a fault is detected. In FIG. 1, both switches S1 and S2 are shown in de-energized position.

The output signal $IPQ_A$ is applied for engine control, whereas the output signal $IPQ_B$ is used for engine control and protection purposes.

Figure 2:
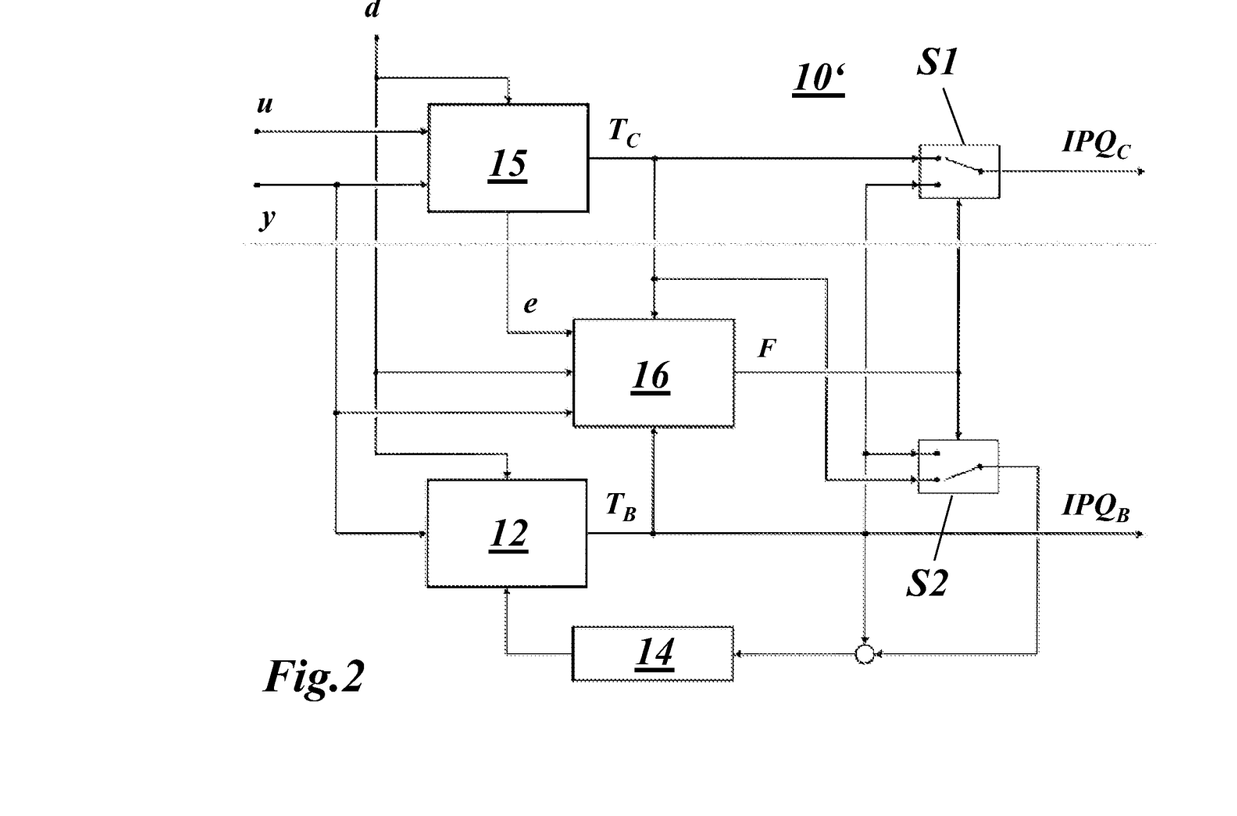
FIG. 2 shows a schematic diagram of a second embodiment of the invention: Continuous adaptation of a IPQ estimator 12 to match the output of an implicit estimation method 15 (observer); if a fault in the operation of the observer 15 is detected, the adaptation 14 is stopped and the output of the observer 15 is switched (bumpless transfer) to the output of the IPQ estimator 12.

The embodiment shown in FIG. 2 augments a IPQ estimator 12 with an observer 15 (parameter and process estimator) that is based on a dynamic model of the gas turbine. The observer 15 factors in the commanded process inputs u (e.g., fuel mass flow rate, compressor VGV (variable guide vane) position, etc.), a vectorial signal d of measured external inputs (e.g., relative humidity, ambient pressure, mechanical speed, etc.), and compares the predicted process outputs with the actual, measured outputs y (e.g., TK2, pK2, TAT, PWR etc.) in order to update the prediction and to determine an accurate estimate of IPQ. The signal e is a vectorial signal of auxiliary observer outputs like estimated process quantities, estimated system parameters, etc.

The operation of the observer 15 is supervised by an observer supervision 16, and a fault indicative signal F is used to switch the output of the observer 15 (bumpless transfer) and to stop the adaptation of the IPQ estimator 12 if a fault is detected. Both switches S1 and S2 are shown in de-energized position.

In this embodiment, both output signals $IPQ_C$ and $IPQ_B$ are used to control the engine and the output signal $IPQ_B$ is used for engine protection purposes.

Figure 3:
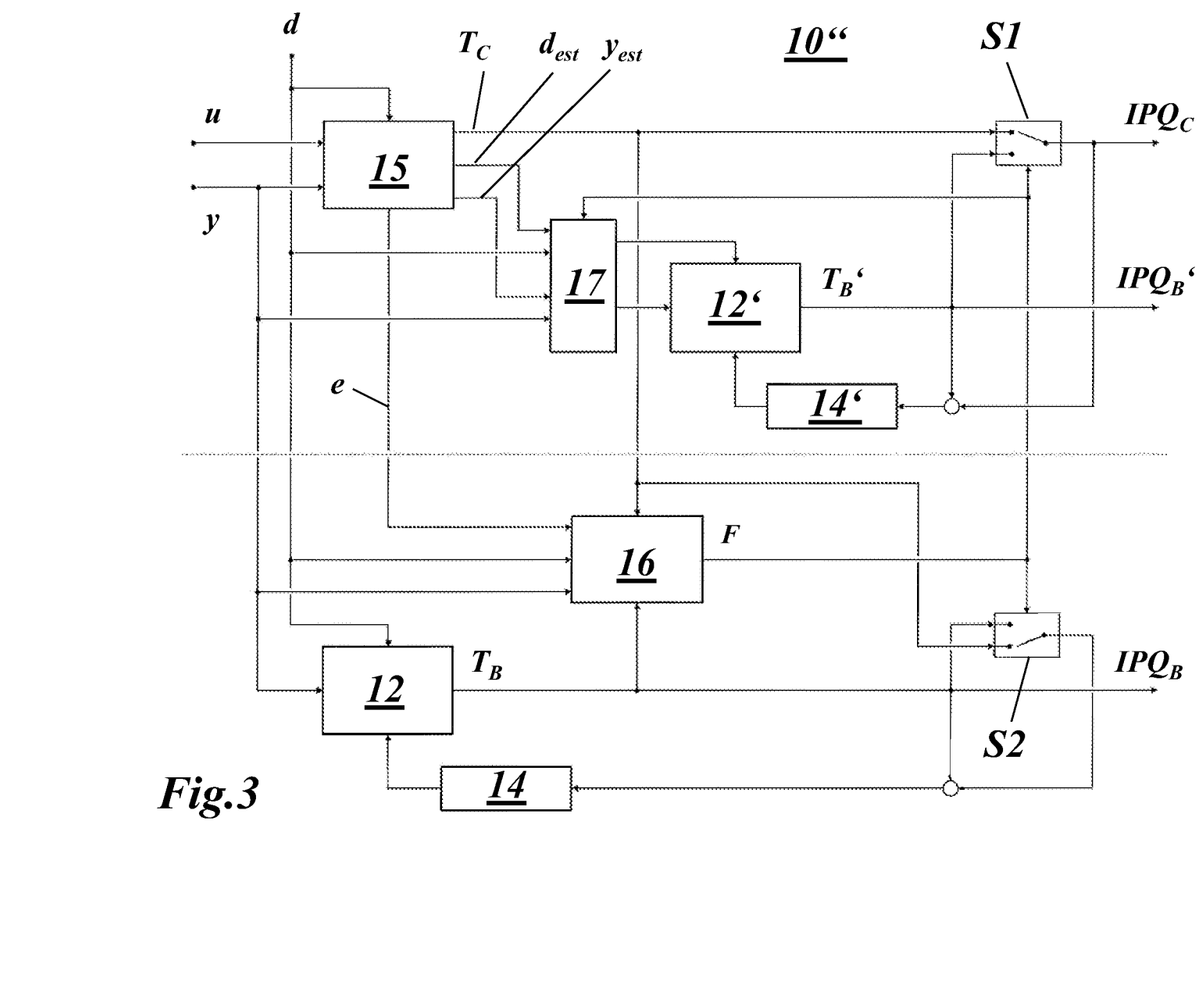
FIG. 3 shows a schematic diagram of a third embodiment of the invention: Continuous adaptation of a robust IPQ estimator 12 and a more complex IPQ estimator 12' to match the output of an implicit estimation method 15 (observer); the observer 15 is applied in combination with IPQ estimator 12' in order to compensate for sensor delays and/or to back up faulty measurements; if a fault in the observer operation is detected, the adaptations 14 and 14' are stopped and the output of the observer is switched (bumpless transfer) to the output of the IPQ estimator 12'.

The third embodiment as shown in FIG. 3 augments a robust IPQ estimator 12 with a combination of a model-based observer 15 (parameter and process estimator) and a sophisticated IPQ estimator 12'. In this embodiment, the observer 15 determines an accurate estimate of IPQ as well as estimates $y_{est}$ and $d_{est}$ of internal process quantities and external quantities based on a vectorial signal d of measured external inputs (e.g., ambient pressure, mechanical speed, etc.), a vectorial signal y of measured process quantities (e.g., TK2, pK2, TAT, PWR, etc.), and a vectorial signal u of commanded process inputs (e.g., fuel mass flow rate, compressor VGV position, etc.). The observer 15 outputs $d_{est}$ and $y_{est}$ are used in 17 at the input of the IPQ estimator 12' in order to compensate for sensor lags (dynamic acceleration) and/or to dynamically align sensor signals with different response behaviour, and/or to back up faulty measurements (fault accommodation). The signal e is a vectorial signal of auxiliary observer outputs like estimated process quantities, estimated system parameters, etc. The operation of the observer 15 is supervised (observer supervision 16) and a fault indicative signal F is used to switch the output of the observer 15 (bumpless transfer), to alter the measurement conditioning 17, and to stop the adaptation 14 and 14' of the IPQ estimators 12 and 12' if a fault is detected. Both switches S1 and S2 in FIG. 3 are shown in de-energized position.

In this embodiment, the outputs $IPQ_C$ and $IPQ_B'$ are used to control the engine and the outputs $IPQ_B'$ and $IPQ_B$ are used for engine protection purposes.

Besides the three examples shown in the figures and explained in the description, further embodiments of the invention are possible. For example, the embodiment shown in FIG. 1 could be combined with the embodiment shown in FIG. 3, i.e. to a solution with individual, cascaded supervision of the observer 15 and the IPQ estimator 12' (i.e. if a fault is detected on the observer 15, the observer 15 is not used as reference for the IPQ estimator 12 but the IPQ estimator 12') and an adaptation of IPQ estimator 12 based on the output of IPQ estimator 12'. If a fault relevant for IPQ estimator 12' is detected, also the use of IPQ estimator 12' is stopped and operation continues with IPQ estimator 12.

The temperature $IPQ_C$ in the embodiments shown in FIG. 2 and FIG. 3 is a highly dynamic estimation of IPQ. As such, it can for example be used to improve the flame stability (pulsations) and emission behaviour of the combustion during fast transient manoeuvres.

Advantages and Benefits

Below, the main features and the key advantages of the present invention are briefly summarized.

- With the simultaneous evaluation of two IPQ estimators, a high availability can be achieved without having to compromise the performance or lifetime relevant accuracy of the temperature control.
- Since the integrated adjustment mechanism continuously aligns the two temperature estimations, an increase of the temperature safety margins is not required.

If the IPQ estimator(s) is (are) combined with a model-based observer, which directly estimates the relevant process quantity (as shown in the second and third embodiments of FIGS. 2 and 3), a number of additional benefits result. These are as follows.

- With the application of a model-based observer, the calculation of IPQ is continuously adjusted as a function of the estimated current engine operating condition. (Note: Due to a different thermal state, component degradation and aging or other deteriorating effects, the actual condition of a gas turbine might deviate from the condition that was present when the IPQ estimator was calibrated to the engine)
- This enables a highly accurate temperature control over the full operating range and along the entire engine lifecycle.
- As a consequence, safety margins can be reduced for the same component lifetime specifications and the engine performance increases as a result.
- Further, an estimation of IPQ that is not subject to the (comparably slow) sensor dynamics facilitates the tight control of IPQ even during severe engine transients.
- A reduction of unwanted transient temperature excursions directly relates to less thermal stress on the components in the hot gas path, hence to extended component lifetime and to an improved control of combustion related variables.

Moreover, a model-based observer provides the possibility to accommodate for faulty measurements (as introduced in the third embodiment), which can increase the availability of the estimation method even further.

LIST OF REFERENCE NUMERALS 10,10',10" estimation method
11 IPQ estimator
12,12' IPQ estimator
13 supervision of IPQ estimator 11
14,14' adaptation mechanism
15 observer
16 observer supervision
17 measurement conditioning
18 control/protection unit
19 gas turbine
20 compressor
21 combustor
22 turbine
23 air inlet
24 fuel supply
25 exhaust gas outlet
d measured external inputs (e.g. ambient pressure, mechanical speed)
$d_{est}$ estimated d
e auxiliary observer outputs (e.g. estimated process quantities)
F fault indicative signal
$K_I$ adaptation parameter
$K_P$ adaptation parameter
pK2 compressor outlet pressure
S1,2 switch
PWR gas turbine power output
s Laplace variable
$T_A$ estimation of gas turbine performance and lifetime indicative process quantity
$T_B, T_B'$ estimation of gas turbine performance and lifetime indicative process quantity
$T_C$ estimation of gas turbine performance and lifetime indicative process quantity
TAT turbine exhaust temperature
IPQ gas turbine performance and lifetime indicative process quantity
$IPQ_A$ estimation of gas turbine performance and lifetime indicative process quantity (output signal)
$IPQ_B, IPQ_B'$ estimation of gas turbine performance and lifetime indicative process quantity (output signal)
$IPQ_C$ estimation of gas turbine performance and lifetime indicative process quantity (output signal)
TK1 compressor inlet temperature
TK2 compressor outlet temperature
u commanded process inputs (e.g. fuel mass flow rate, compressor VGV position)
VGV compressor variable guide vanes
y actual measured process quantities (e.g. TK2, pK2, TAT, PWR)
$y_{est}$ estimated y

The invention claimed is:

1. A method for the control and protection of a gas turbine, comprising:
estimating a gas turbine performance and lifetime indicative process quantity from a set of available process signals and circumventing a trade-off between estimation accuracy and availability, by simultaneously evaluating the gas turbine performance and lifetime indicative process quantity by a first estimation method and evaluating the gas turbine performance and lifetime indicative process quantity by a second estimation method, wherein the first estimation method has a high prediction accuracy, and the second estimation method having less input dependencies than the first estimation method;
conducting a continuous adaptation of the second estimation method in order to continuously align an output signal of the second estimation method with an output signal of the first estimation method;
in case of a detection of a fault in an evaluation of any input dependency of the first estimation method, switching the output of the first estimation method to the output of the second estimation method, and
wherein the second estimation method uses for the estimation an indicative process quantity (IPQ) estimation function of the form:

$$T_B = a \cdot TAT + b \cdot pK2 + c,$$

with parameters a, b, c, where TAT is turbine exhaust temperature and pK2 is compressor outlet pressure; and operating the gas turbine in accordance with the method for the control and protection of the gas turbine.

2. The method as claimed in claim 1, wherein the gas turbine performance and lifetime indicative process quantity is a hot gas temperature at a combustor exit.

3. The method as claimed in claim 1, wherein the gas turbine performance and lifetime indicative process quantity is a temperature at an inlet of a first turbine stator (vane) row.

4. The method as claimed in claim 1, wherein the gas turbine performance and lifetime indicative process quantity is a temperature at an inlet of a first turbine blade row.

5. The method as claimed in claim 1, wherein the first estimation method uses for the estimation an observer, which compares predicted process outputs with actual, measured outputs in order to determine an accurate estimate of the gas turbine performance and lifetime indicative process quantity whereby the predicted process outputs are determined based on a dynamic model of the gas turbine that uses as inputs commanded process inputs and a vectorial signal of measured external inputs.

6. The method as claimed in claim 1, wherein the continuous adaptation comprises an adaptation mechanism, which uses a PI controller that acts on the constant c of the IPQ estimation function of the second estimation method according to the following formula:

$$c = c_0 + (K_P + K_I/s) \cdot (T_A - T_B),$$

where $K_P$ and $K_I$ are the parameters of PI controller transfer function.

7. The method as claimed in claim 1, wherein the continuous adaptation comprises an adaptation mechanism, which uses a PI controller.

8. The method as claimed in claim 1, comprising:
using the fault indicative signal to actuate two switches to switch the output of the first estimation method and to stop the adaptation of the second estimation method.

9. The method as claimed in claim 1, comprising:
using the fault indicative signal to actuate one switch to switch the output of the first estimation method and to stop the adaptation of the second estimation method.

10. The method as claimed in claim 1, comprising:
implementing the switching of the first output of first estimation method to the output of second estimation method as a bumpless transfer.

11. The method as claimed in claim 5, wherein the observer determines estimates of internal process quantities and/or external quantities based on a vectorial signal of measured external inputs, a vectorial signal of measured process quantities, and a vectorial signal of commanded process inputs whereby the estimates of the observer are used in the measurement conditioning at the input of the second estimation method in order to compensate for sensor lags and to improve the dynamic accuracy of the output of the second estimation method and/or to back up faulty measurements.

12. The method as claimed in claim 1, comprising:
applying an output of the second estimation method for engine protection purposes.

13. The method as claimed in claim 1, comprising:
applying one or more of the outputs of the first estimation method and/or of the second estimation method for engine control purposes.

* * * * *